(12) United States Patent
Himeno et al.

(10) Patent No.: US 12,105,326 B2
(45) Date of Patent: Oct. 1, 2024

(54) OPTICAL MULTIPLEXER REDUCED IN BACKGROUND LIGHT

(71) Applicants: SEIREN KST CORP., Fukui (JP); UNIVERSITY OF FUKUI, Fukui (JP)

(72) Inventors: Akira Himeno, Fukui (JP); Koichi Horii, Fukui (JP); Toshio Katsuyama, Fukui (JP); Shoji Yamada, Fukui (JP); Akira Nakao, Fukui (JP)

(73) Assignees: SEIREN KST CORP., Fukui (JP); UNIVERSITY OF FUKUI, Fukui (JP)

( * ) Notice: Subject to any disclaimer, the term of this patent is extended or adjusted under 35 U.S.C. 154(b) by 129 days.

(21) Appl. No.: 17/909,078

(22) PCT Filed: Feb. 26, 2021

(86) PCT No.: PCT/JP2021/007351
§ 371 (c)(1),
(2) Date: Sep. 2, 2022

(87) PCT Pub. No.: WO2021/177167
PCT Pub. Date: Sep. 10, 2021

(65) Prior Publication Data
US 2023/0084204 A1    Mar. 16, 2023

(30) Foreign Application Priority Data
Mar. 4, 2020    (JP) .................................. 2020-036933

(51) Int. Cl.
*G02B 6/293*    (2006.01)
(52) U.S. Cl.
CPC .................................. *G02B 6/2938* (2013.01)

(58) Field of Classification Search
CPC ........ G02B 6/2938; G02B 2006/12104; G02B 2006/12147; G02B 2006/12164;
(Continued)

(56) References Cited

U.S. PATENT DOCUMENTS

| 6,212,307 B1 | 4/2001 | Labeye et al. |
| 10,983,272 B2 | 4/2021 | Takabayashi et al. |

(Continued)

FOREIGN PATENT DOCUMENTS

| EP | 1 959 278 | 8/2008 |
| JP | 61-284707 | 12/1986 |

(Continued)

OTHER PUBLICATIONS

Extended European Search Report issued Jan. 30, 2024 in corresponding European Patent Application No. 21764157.0.
(Continued)

*Primary Examiner* — John Bedtelyon
(74) *Attorney, Agent, or Firm* — Wenderoth, Lind & Ponack, L.L.P.

(57) ABSTRACT

An optical multiplexer reduced in background light and reduced in size is provided. The optical multiplexer takes a plurality of light beams having different wavelengths as input from respective waveguides, and outputs multiple light obtained by multiplexing the plurality of light beams by a directional coupler. Background light is reduced by a reflection groove which reflects excess light outputted from a discard port of the directional coupler, and downsizing of the optical multiplexer is achieved.

5 Claims, 4 Drawing Sheets

(58) Field of Classification Search
CPC ...... G02B 2006/12176; G02B 6/12007; G02B 6/29323; G02B 6/136; G02B 6/125
See application file for complete search history.

(56) References Cited

U.S. PATENT DOCUMENTS

| | | | |
|---|---|---|---|
| 11,886,005 B2* | 1/2024 | Sakamoto | G02B 6/2938 |
| 2004/0247245 A1 | 12/2004 | Kim et al. | |
| 2011/0110629 A1* | 5/2011 | Nagano | G02B 6/12007 385/48 |
| 2017/0146744 A1 | 5/2017 | Katsuyama et al. | |

FOREIGN PATENT DOCUMENTS

| | | |
|---|---|---|
| JP | 2004-264868 | 9/2004 |
| JP | 2007-250889 | 9/2007 |
| JP | 2013-195603 | 9/2013 |
| JP | 2018-124394 | 8/2018 |
| JP | 2018-180513 | 11/2018 |
| JP | 6430071 | 11/2018 |
| JP | 2019-35877 | 3/2019 |
| WO | 2019/111401 | 6/2019 |

OTHER PUBLICATIONS

International Search Report dated May 11, 2021 in corresponding International Application No. PCT/JP2021/007351.

* cited by examiner

OPTICAL MULTIPLEXER REDUCED IN BACKGROUND LIGHT

TECHNICAL FIELD

This invention relates to an optical multiplexer for use in an image projection device, the optical multiplexer to which a plurality of light beams emitted from light sources and having different wavelengths in a visible or near-infrared region are inputted from respective waveguides, and which outputs a multiple light beam obtained by multiplexing the plurality of light beams by a directional coupler. Particularly when at least red light, green light, and blue light are used, the optical multiplexer can be applied to an ordinary display device.

BACKGROUND ART

Compact optical multiplexers for use in image projection devices such as eye-wears or portable projectors have been known to which three different wavelength light in three primary colors, red light (R), green light (G) and blue light (B), are inputted and which output multiple light obtained by multiplexing these types of light using a directional coupler (see, for example, Patent Documents 1 to 3).

At the output end surface of each of these optical multiplexers, desired multiple light is outputted from an output port. Besides the multiple light, excess light which has not contributed to the multiplexing is outputted, as unnecessary background light, from a discard port which is a waveguide output terminal other than the output port in the directional coupler. When the optical multiplexer is downsized, therefore, the problem of deterioration in the quality of an outputted image has been posed.

Concretely, with the conventional optical multiplexer, there has been known a configuration in which a constant distance is maintained in the direction of propagation from the trailing end of the discard port to the output end surface of the optical multiplexer, or in which the distance to the output port is gradually increased, with the discard port being curved. To obtain a sufficient effect, however, the size of a circuit needs to be enlarged. Even if the discard port is sufficiently separated, moreover, excess light appearing from different parts of the circuit enters a cladding portion surrounding the output port. Thus, the problems have arisen that the output intensity of background light increases, thus causing quality deterioration such as unsharpness of an image of multiple light outputted.

In regard to measures or methods for reducing background light as mentioned above, a tapered waveguide with a width or the like changed in a tapered manner, a grating waveguide for diffracting unnecessary light, a ring resonator type waveguide for resonating unnecessary light, and so on have been proposed as waveguides for suppressing excess light outputted from the discard port (see Patent Document 4).

The above measures or methods, however, have encountered difficulty in sufficiently reducing background light, and also difficulty in downsizing the optical multiplexer.

PRIOR ART DOCUMENTS

Patent Documents

Patent Document 1: JP-A-2019-035877
Patent Document 2: JP-A-2013-195603
Patent Document 3: JP-A-2018-124394
Patent Document 4: JP-A-Sho-61-284707

SUMMARY OF THE INVENTION

Problems to be solved by the invention

The present invention has been accomplished in the light of the circumstances described above. Its object is to provide an optical multiplexer reduced in background light and reduced in size.

Means for solving the problems

The present invention provides an optical multiplexer to which a plurality of light beams having different wavelengths are inputted from respective waveguides, and which outputs a multiple light beam obtained by multiplexing the plurality of light beams by a directional coupler, characterized in that background light is reduced by a reflection groove which reflects excess light outputted from a discard port of the directional coupler.

The plurality of light beams having different wavelengths are attained by using a plurality of light sources each outputting single light, the wavelength of the single light outputted from each light source being different from that of the single light outputted from one another light source.

Two or more of the directional couplers are used. For the purpose of downsizing, it is preferred to use 5 or less of the directional couplers, and it is more preferred to use 3 or less of the directional couplers. The use of 6 or more of them makes it difficult to downsize the optical multiplexer.

The directional coupler is a directional coupler having 1 or 2 input ports and 2 output ports. The output ports are divided into the port for outputting light which contributes to multiplexing into multiple light, and the port for outputting excess light which does not contribute to multiplexing into the multiple light. There is a case where the plurality of directional couplers are connected together and used, but the port for outputting excess light which finally does not contribute to multiplexing into the multiple light is called the discard port.

An angle at which the excess light is reflected is preferably 60° to 120° with respect to a direction of light inputted from an input end surface to an output end surface of the optical multiplexer. This angle is particularly preferably 80° to 100°. If the angle is less than 60°, reflection in the direction of inputted light is so great that the quality of an image may be influenced. 3f the angle exceeds 120°, reduction of background light may be difficult.

It is preferred that a cladding layer ranging from the reflection groove to the output end surface of the optical multiplexer be removed, with a part around the output port being left intact. When the cladding layer other than that in the part around the output port is removed, it is possible to reduce excess light more efficiently.

It is preferred for a metal thin film to be formed on a bottom surface of the reflection groove. When the metal thin film is formed, it is possible to reduce excess light even more efficiently.

As a metal for use in the metal thin film, a publicly known metal such as gold (Au), silver (Ag), aluminum (Al), or chromium (Cr) can be used. As a method for producing the metal thin film, a publicly known manufacturing method such as physical vapor deposition (PVD) or chemical vapor deposition (CVD) can be used.

The plurality of light beams having different wavelengths preferably include at least red light, green light and blue light.

Other light beams having different wavelengths are exemplified by, but not limited to, yellow light, orange light, indigo light, and purple light.

An image projection device including the optical multiplexer is provided.

The image projection device of a small size is used for an eyeglass type terminal or a portable projector applications.

Effects of the Invention

The present invention concerns an optical multiplexer to which a plurality of light beams having different wavelengths are inputted from respective waveguides, and which outputs a multiple light beam obtained by multiplexing the plurality of light beams by a directional coupler. The optical multiplexer exhibits the effects that it can be downsized while retaining the satisfactory property of reducing background light by a reflection groove which reflects excess light outputted from a discard port of the directional coupler.

BRIEF DESCRIPTION OF THE DRAWINGS

FIG. 4(b) is a plan view of the optical multiplexer in Example 3 of the present invention, showing a reflection groove part enlarged, with a metal thin film being formed on a bottom surface of a reflection groove.

MODE FOR CARRYING OUT THE INVENTION

Embodiments for exploitation of the present invention will be described hereinbelow by reference to the accompanying drawings. However, the invention is not limited to these embodiments.

Figure 1:
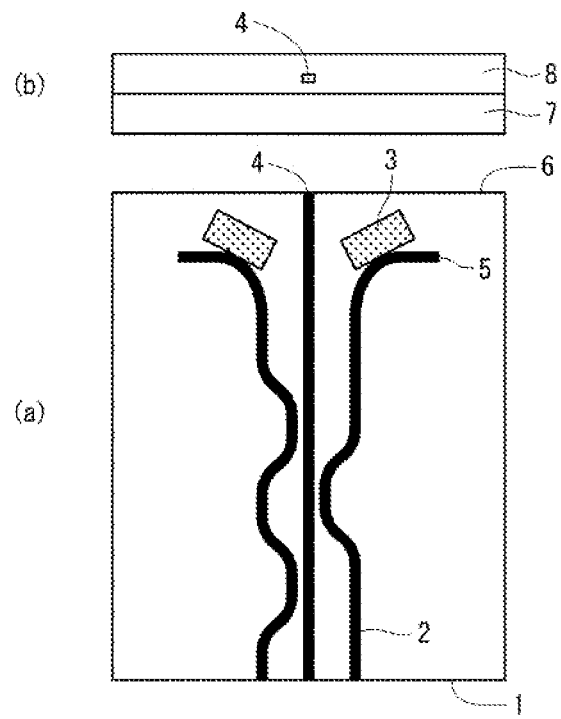
FIG. 1(a) is a plan view of an optical multiplexer in Example 1 of the present invention.
FIG. 1(b) is a front view of the optical multiplexer as viewed from its output end surface side.

FIG. 1(a) is a plan view of an optical multiplexer in Example 1 of the present invention, and FIG. 1(b) is a front view of the optical multiplexer as viewed from the side of its output end surface 6. R, G and B, three types of light having three primary colors, are inputted from respective waveguides 2 with the use of light sources, such as laser diodes, at an input end surface 1 of the optical multiplexer. The three primary color RGB beams are multiplexed by 3 directional couplers (portions where the two waveguides 2 are close to each other), and the resulting multiple light is outputted from an output port 4 at the output end surface 6. The waveguides 2 are provided in a cladding layer 8 on a substrate 7 by a publicly known manufacturing method such as photolithography.

In regard to the manufacturing method for optical waveguides, etc., detailed manufacturing methods and structures are described in Patent Document 2. A general optical waveguide is structured such that the dimensions of a core are of the order of 1×1 to 5×5 μm, and a relative refractive index difference between the core and a cladding is of the order of 0.3 to 3.0%. By selecting values in these ranges appropriately, the optical waveguide can also be produced. As regards the core dimensions, the cross-sectional shape of the core is not limited to a square shape, and may be a different shape such as a semicircular shape.

Excess light in the waveguides of the directional couplers, other than the output port 4, is totally reflected by a reflective surface of a cube-shaped reflection groove 3 provided in the cladding layer 8, and is outputted from a discard port 5. Thus, background light which affects the image quality of multiple light outputted from the output port 4 is reduced.

If there are a plurality of the discard ports 5, formation of the reflection groove 3 for at least one of the discard ports 5 is included in the scope of the present invention.

The reflection groove 3 is formed by processing a predetermined portion in the cladding layer 8 by a publicly known method such as etching. The shape of the reflection groove 3 is not particularly limited. In order to reflect excess light totally, however, it is important for the reflection groove to have a structure in which the reflective surface is close to a plane.

The length of the waveguide having the discard port 5 at its trailing end may be, at least, such a length as to end ahead of the reflective surface of the reflection groove 3. In this case, the excess light outputted from the discard port 5 is reflected by the reflective surface, but is turned into dispersed light in a direction away from the output port 4, thus sufficiently exhibiting the effect of reducing background light.

The total reflection of the excess light requires that the incidence angle of the excess light to the reflective surface be greater than a critical angle θc represented by "sinθc=(n2/n1), θc=arcsin(n2/n1) where n1 is the refractive index of the waveguide 2, n2 is the refractive index of the reflection groove 3, and n1>n2".

If n1=1.45, and n2=1 (air), then θc is calculated as 43.6°.

Adjustment of the incidence angle of excess light can be made using the inclination angle of the reflective surface in the reflection groove 3. The inclination angle of the reflective surface is set at 45° with respect to the direction of inputted light from the input end surface toward the output end surface of the optical multiplexer, whereby the incidence angle of excess light to the reflective surface, in the sane direction as the direction of inputted light, can be made 45° which is greater than 43.6°.

By so doing, since the incidence angle and the reflection angle are equal, the excess light is reflected at 90(45×2=90)°, with respect to the incidence of the excess light, in this case. Thus, the angle at which the excess light is reflected comes to 90° with respect to the direction of inputted light from the input end surface toward the output end surface of the optical multiplexer.

FIG. 2(a) is a plan view of an optical multiplexer in Example 2 of the present invention, and FIG. 2(b) is a front view of the optical multiplexer as viewed from the side of its output end surface 6. The present Example 2 is different from Example 1 in that the shape of a reflection groove 3 is triangular, and a cladding layer 8 reaching the output end surface 6 of the optical multiplexer is removed, with a portion around an output port 4 remaining.

Since the cladding layer 8 is removed except for the portion around the output port 4, background light can be reduced more efficiently.

Figure 3:
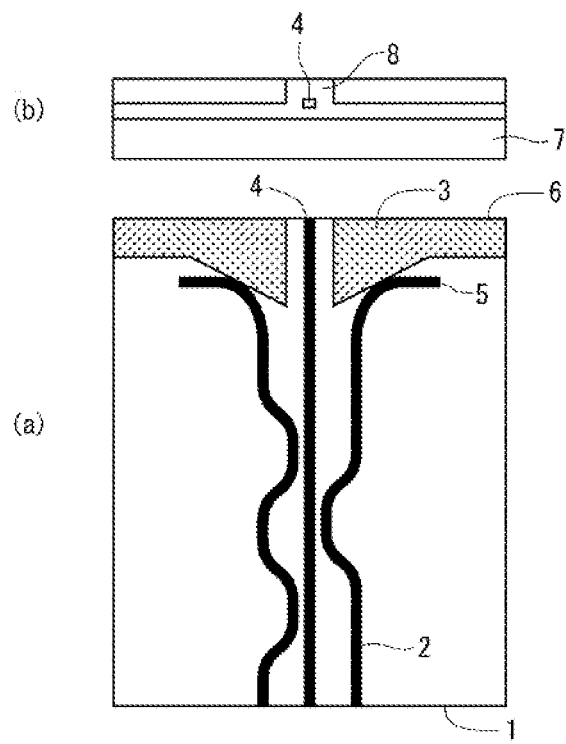
FIG. 3(a) is a plan view of an optical multiplexer in Example 3 of the present invention.
FIG. 3(b) is a front view of the optical multiplexer as viewed from its output end surface side.

FIG. 3(*a*) is a plan view of an optical multiplexer in Example 3 of the present invention, and FIG. 3(*b*) is a front view of the optical multiplexer as viewed from the side of its output end surface 6. Example 3 is different from Example 1 in that the shape of a reflection groove 3 is an irregular pentagonal shape, and a cladding layer 8 reaching the output end surface 6 of the optical multiplexer is removed, with a portion around an output port 4 remaining.

Since the cladding layer 8 is removed except for the portion around the output port 4, background light can be reduced more efficiently.

Figure 2:
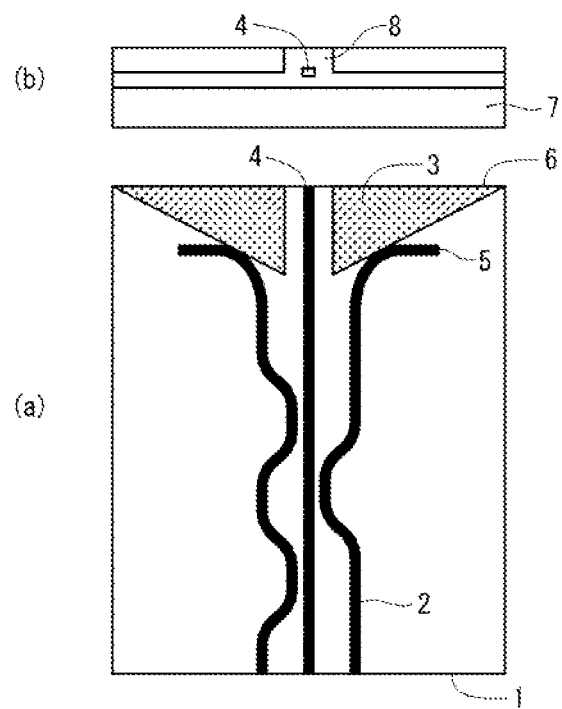
FIG. 2(a) is a plan view of an optical multiplexer in Example 2 of the present invention.

It is to be noted that the shapes of the reflection groove 3 shown in FIGS. 2 and 3 are merely examples, and they are not limiting. At least a shape, which involves a reflective surface having the same actions and functions as those of the reflective surface in the reflection groove 3 of FIG. 1(*a*), is included in the scope of the present invention.

Figure 4:
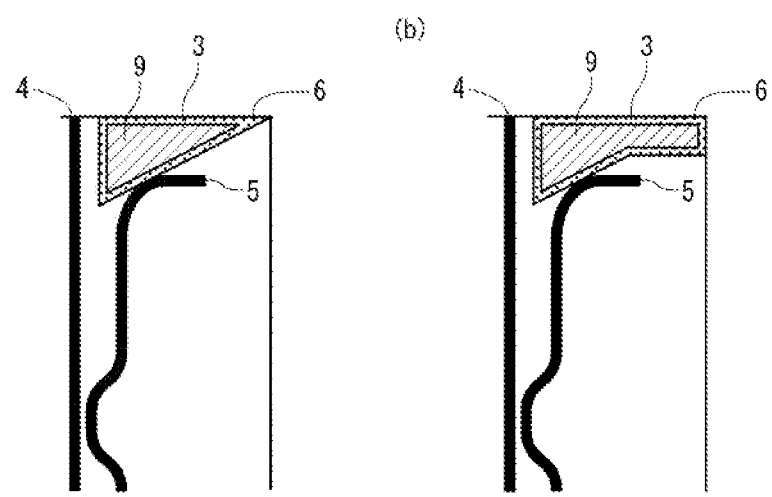
FIG. 4 (a) is a plan view of the optical multiplexer in Example 2 of the present invention, showing a reflection groove part enlarged, with a metal thin film being formed on a bottom surface of a reflection groove.

FIG. 4(*a*) is a plan view showing a part ranging from a reflection groove 3 to an output end surface 6 on an enlarged scale in the optical multiplexer in Example 2 of the present invention, with a bottom surface of the reflection groove 3 being formed with a metal thin film 9. FIG. 4(*b*) is a plan view showing a part ranging from a reflection groove 3 to an output end surface 6 on an enlarged scale in the optical multiplexer in Example 3 of the present invention, with a bottom surface of the reflection groove 3 being formed with a metal thin film 9.

By forming the metal thin film 9 on the bottom surface of the reflection groove 3, background light can be reduced even more efficiently.

Moreover, the metal thin film 9 can be formed at a reflective surface of the reflection groove 3, although this is not illustrated. The reflective surface formed with the metal thin film 9 can reflect excess light, and reduce background light, even more efficiently.

Figure 5:
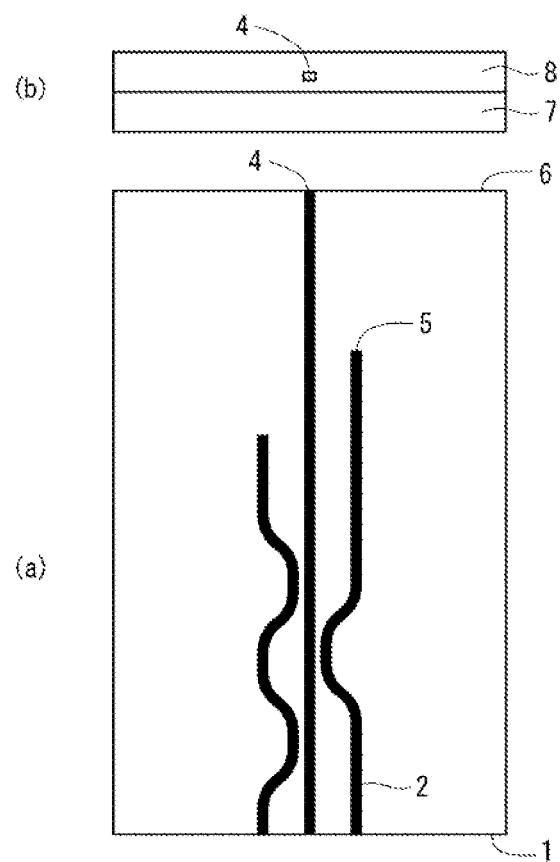
FIG. 5(a) is a plan view of an optical multiplexer in comparative Example 1 relative to the present invention.
FIG. 5(b) is a front view of the optical multiplexer as viewed from its output end surface side.

FIG. 5(*a*) is a plan view of an optical multiplexer in Comparative Example 1 relative to the present invention, and FIG. 5(*b*) is a front view of the optical multiplexer as viewed from the side of its output end surface 6.

At the output end surface 6 of the optical multiplexer, multiple light is outputted from an output port 4 for multiple light. Besides, excess light, which has turned into dispersed light without contributing to multiplexing, is outputted as unnecessary background light from the trailing end of a discard port 5 serving as an output waveguide other than the output port 4 in a directional coupler. In this case, if the distance between the discard port 5 and the output end surface 6 is shortened in an attempt to downsize the optical multiplexer, the output intensity of background light with respect to the output intensity of multiple light is increased relatively to deteriorate the image quality of multiple light. To reduce the output intensity of background light to a level at which the image deterioration poses no problem for practical use, the distance from the discard port 5 to the output end surface 6 needs to be increased to a certain value or higher. Thus, there are limits to downsizing of the optical multiplexer of Comparative Example 1.

Figure 6:
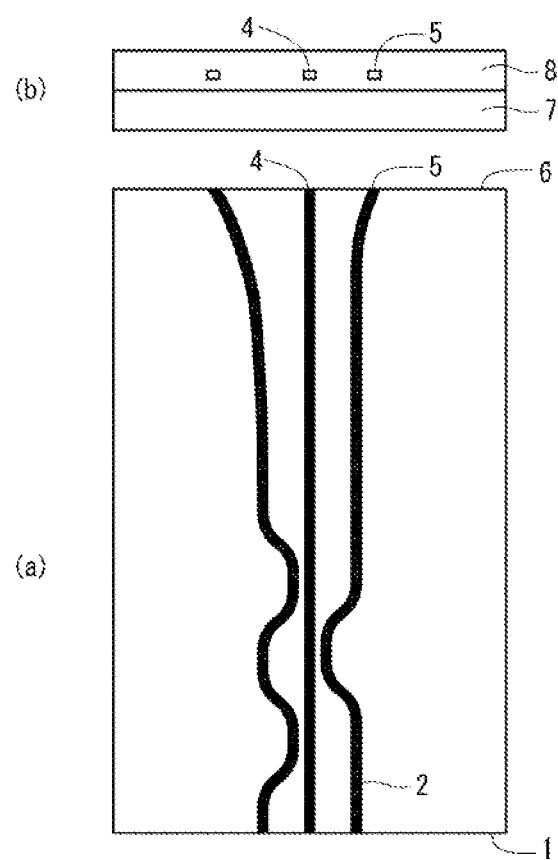
FIG. 6(a) is a plan view of an optical multiplexer in Comparative Example 2 relative to the present invention.
FIG. 6(b) is a front view of the optical multiplexer as viewed from its output end surface side.

FIG. 6(*a*) is a plan view of an optical multiplexer in comparative Example 2 relative to the present invention, and FIG. 6(*b*) is a front view of the optical multiplexer as viewed from the side of its output end surface 6.

At the output end surface 6 of the optical multiplexer, multiple light is outputted from an output port 4 for multiple light. Besides, excess light is outputted from a discard port 5 constructed by gradually spacing an output waveguide, other than the output port 4 in a directional coupler, away from the output port 4 while curving the output waveguide.

Spacing of the discard port 5 from the output port 4 for multiple light upgrades the image quality of multiple light.

If the bending radius of the curved waveguide 2 is small, the incidence angle of excess light to a cladding layer 3 becomes smaller than a critical angle, at the interface of the curved waveguide, thus making total reflection impossible. Consequently, light that has leaked generates background light, thereby deteriorating the image quality of multiple light.

Hence, the discard port 5 is spaced from the output port 4 for multiple light, and the incidence angle of excess light to the cladding layer 8 is rendered greater than the critical angle to achieve total reflection. For these purposes, the bending radius of the curved waveguide 2 needs to be a certain value or more. Thus, there are limits to downsizing of the optical multiplexer of Comparative Example 2.

Industrial Applicability

The present invention concerns an optical multiplexer to which a plurality of light beams having different wavelengths are inputted from respective waveguides, and which outputs a multiple light beam obtained by multiplexing the plurality of light beams by a directional coupler. The optical multiplexer can reduce background light by a reflection groove which reflects excess light outputted from a discard port of the directional coupler. It also realizes downsizing of the optical multiplexer.

Explanations of Letters or Numerals

1 Input end surface of optical multiplexer
3 Reflection groove
4 Output port for multiple light
5 Discard port of directional coupler
6 Output end surface of optical multiplexer
7 Substrate of optical multiplexer
8 Cladding layer
9 Metal thin film

The invention claimed is:

1. An optical multiplexer to which a plurality of light beams having different wavelengths are inputted from respective waveguides, and which outputs a multiple light beam obtained by multiplexing the plurality of light beams by a directional coupler, wherein
    the optical multiplexer includes a reflection groove configured to reduce background light by reflecting excess light outputted from a discard port of the directional coupler, and
    a cladding layer ranging from the reflection groove to an output end surface of the optical multiplexer is removed, with a part of the cladding layer around an output port of the optical multiplexer being left intact.

2. The optical multiplexer according to claim 1, wherein an angle at which the excess light is reflected is 60° to 120° with respect to a direction of light inputted from an input end surface toward the output end surface of the optical multiplexer.

3. The optical multiplexer according to claim 1, wherein a metal thin film is formed on a bottom surface of the reflection groove.

4. The optical multiplexer according to claim 1, wherein the plurality of light beams having different wavelengths include at least red light, green light, and blue light.

5. An image projection device including the optical multiplexer according to claim 1.

* * * * *